Oct. 27, 1931.　　　　　J. C. SWAN　　　　　1,829,424
APPARATUS FOR CONDENSING HYDROCARBON VAPORS AND THE LIKE
Filed March 25, 1929
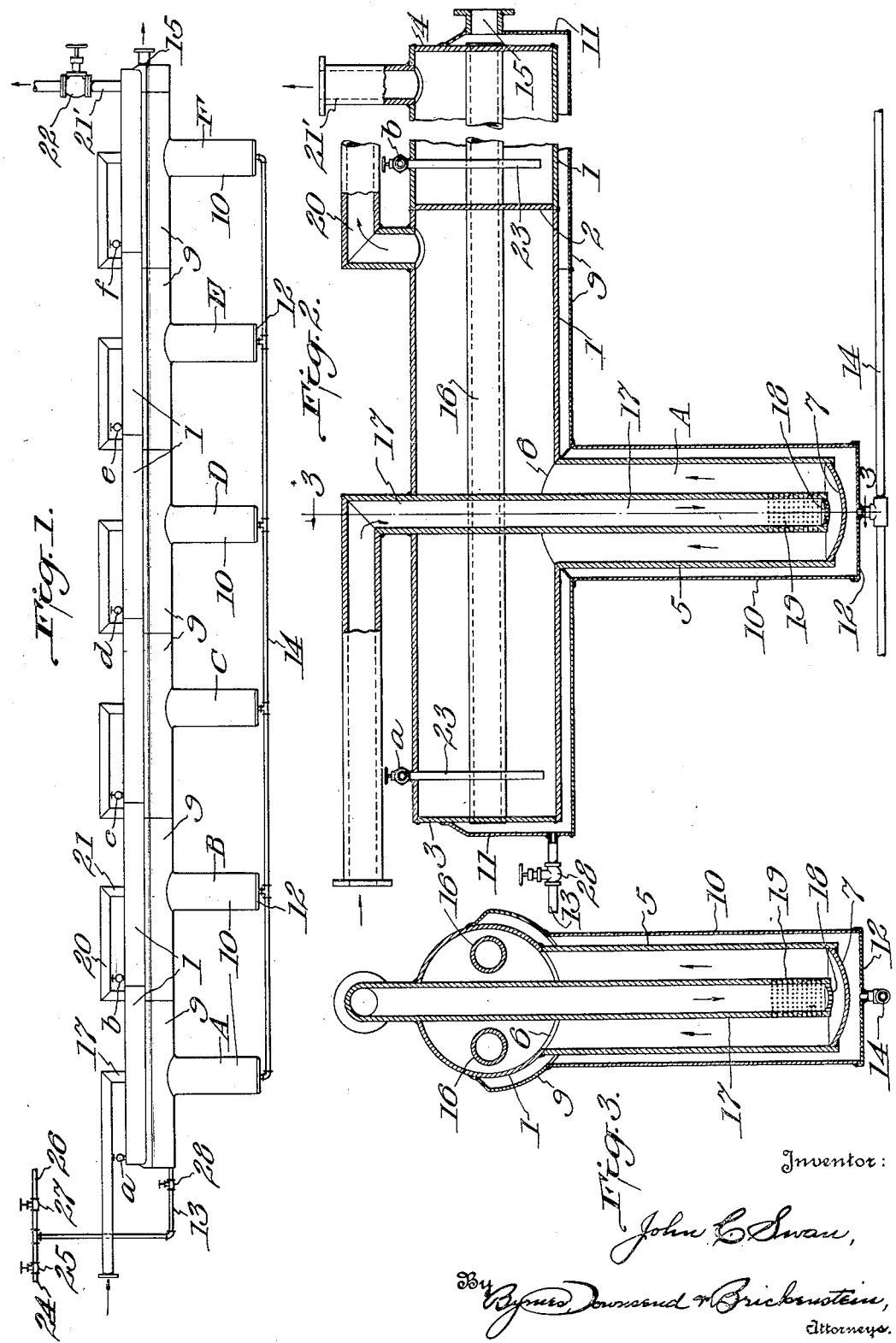
Inventor:
John C. Swan,
By Byrnes Townsend & Brickenstein,
Attorneys.

Patented Oct. 27, 1931

1,829,424

UNITED STATES PATENT OFFICE

JOHN C. SWAN, OF MARIETTA, OHIO

APPARATUS FOR CONDENSING HYDROCARBON VAPORS AND THE LIKE

Application filed March 25, 1929. Serial No. 349,717.

This invention relates broadly to the separation of condensible vapors from the carrier gases in which they are found and, specifically, to apparatus wherein such separation may be accomplished continuously efficiently and economically.

The apparatus is designed primarily for the treatment or processing of natural gas carrying condensible hydrocarbons of the paraffin series, and is adapted to separate, by condensation, and separately collect the various condensible components of the series, specifically octane, heptane, hexane, pentane, butane and propane.

However, the apparatus may be used equally effectively for the treatment or processing of gases other than natural gas, such, for example, as gases of the olefine series, waste gases from oil refineries where cracking stills are used, vapors which collect in oil storage tanks due to the heat of the sun or of the atmosphere upon such tanks, and in fact any gases carrying condensible vapors, or vapors unmixed with gases.

The object of the invention is to provide apparatus of high efficiency but of markedly simple construction as compared with known apparatus designed to perform similar functions.

The invention consists essentially in apparatus for separating condensible vapors from the carrier gases in which they are found, and comprises preferably a horizontally arranged tubular body, divided throughout its length by a plurality of diaphragms or partitions forming within the body a plurality or series of separate compartments equal in number to the number of components to be separated from the gas stream. Each of these compartments communicates with a depending well or condenser chamber, and enclosing these chambers and a portion of the body circumferentially thereof is a jacket or shell for the reception of a refrigerating medium, and this medium is also made effective within the body by conduits extending throughout its length and in communication with jacketed spaces at its ends. Gas conducting tubes provided with perforated lower ends extend into the wells and terminate adjacent to their bottoms, and the wells of successive compartments after the first compartment have their gas tubes in communication with their respective preceding compartments. Means are provided for introducing and controlling the pressure of the gas to be treated, for introducing circulating and controlling the pressure and temperature of the refrigerant, and for drawing off the various condensates.

In the accompanying drawings illustrating the invention somewhat diagrammatically, and in the several figures of which like parts are similarly designated,—

Fig. 1 is a side elevation of the complete apparatus;

Fig. 2 is a fragmentary longitudinal vertical section of the same, and

Fig. 3 is a transverse vertical section of the same, taken substantially on line 3—3 of Fig. 2.

Primarily, it will be noted that, due to the nature of the materials to be treated and produced by and used in my apparatus, and the pressures established, maintained and occurring therein, it is essential that all joints either in the apparatus proper or in pipes and pipe connections leading thereto be absolutely tight, and to this end the apparatus is so designed and constructed that all joints may be welded and glands and other packings dispensed with. Where valves are necessary, types which may be sealed are employed.

Ammonia or any other suitable refrigerating medium may be employed. If ammonia is used, I employ, of course, no metal which contains copper in the construction of my apparatus. Preferably standard steel tubing and plate are used throughout, and as steel lends itself readily to welding it is especially suitable for my purposes.

The apparatus proper comprises, essentially, a body preferably of tubular form made up of a plurality of sections 1 of a length easy to handle, and each of such sections has welded to it at one end a diaphragm or partition 2 (Fig. 2). At the left-hand end of the body 1, as shown, the partition forms a head 3, while at the right-hand end a similar head 4 is welded. These several sections are butt-welded together to form the complete body composed of a plurality of separate compartments, and as many of such sections may be used as may be necessary to provide a separate compartment for each condensate to be recovered from the gas treated. I have spoken of natural gas as the gas to be treated and have mentioned the recovery from same of the six fractions, octane, heptane, etc., and, with this as an example, I have shown in Fig. 1 an apparatus of six sections and having, therefore, six separate compartments.

Communicating with each compartment is a well or condensing chamber formed of a tube 5 welded at an opening 6 formed in the body section and depending therefrom and closed at its bottom by a plate 7 welded in place. These six wells or condensing chambers are designated A, B, C, D, E and F, respectively.

A jacket composed of a plurality of sections 9 of appropriately formed plate steel and of tubes 10, all welded together, encloses, in spaced relation, a portion of the body 1 and the chambers 5, and this jacket is closed at the ends of the body by plates 11 and at the ends of the tubes 10 by heads 12, also welded. As will be seen, particularly by reference to Figs. 2 and 3, the upper edges of the plate sections 9 and end plates 11 are bent inwardly and welded throughout to the body. Thus a closed space is formed around these enclosed parts for the reception of the refrigerating medium.

The refrigerant is admitted to this space through a pipe 13, hereinafter more fully described, and circulation of the same in and around the several condensing chambers or wells is facilitated by a manifold 14. A refrigerant vapor outlet is provided at 15.

For the purpose of supplementing the cooling action of the refrigerant confined within the jacket, I provide tubes 16 running the full length of the body and welded to the heads and partitions 3, 2 and 4 and communicating at their ends with the jacketed space. These tubes are thus filled at all times with the cold refrigerant vapor.

The gas to be treated or processed is introduced into the chamber A through a tube 17 which extends through the body and down into chamber A to within a short distance of the bottom plate 7. The end of this tube is closed, as shown at 18 and its lower extremity is provided with a plurality of small perforations 19 the aggregate cross-sectional area of which is equal to the interior cross-sectional area of the tube. This arrangement causes the gas to issue from the tube into the chamber in a multiplicity of small streams which, in the presence of liquid in the chamber, will cause the gas to bubble through such liquid, as will be hereinafter more fully explained.

The gas and uncondensed vapors leaving the first compartment pass through an outlet 20 which communicates with a tube 21 similar in all respects to the tube 17 and extending into chamber B. Thus the gas passes in succession from each chamber and compartment to the next and in each is stripped of a certain fraction of its vapor content, finally escaping from the last compartment through an outlet pipe 21', controlled by a suitable valve 22.

Suitable similar draw-off pipes 23 extending to within a short distance of the bottom of the body are provided with the several compartments and these draw-offs are valve-controlled at a, b, c, d, e and f, respectively, to provide for the removal of condensate from any of the several compartments, as desired.

In use the entire apparatus is buried in the ground. If possible, it is desirable that a trench be dug to take the body portion and holes to take the wells or chambers, the apparatus being placed in such trench and covered over. If this is not possible, then the chambers only may be sunk in the ground and earth piled around and over the body. In any event, the apparatus should be covered with earth to protect it from lightning, or from other fire hazards, from heat of the sun, and from the elements generally.

Obviously, all operation control elements, such as valve stems and handles will extend above the surface of the covering earth.

In operation, the pipe 13 will be connected through a branch 24 and valve 25 with a suction pump and through a branch 26 and valve 27 with a supply of refrigerant, liquid ammonia, for example. A valve 28 is provided for completely cutting off pipe 13 from its branches.

To start the apparatus, the valves 28 and 25 are opened and the suction pump is operated to exhaust the space within the jacket. When the pressure has been lowered to the required point, valve 25 is closed and valve 27 opened. The ammonia rushes into the jacketed space and vaporizing produces intense cold in the jacketed part of the body, the chambers A, B, C, etc. and tubes 16. The refrigerant vapors escape through 15 to a compressor from which the liquid ammonia is fed back through branch pipe 26. Obviously, variations in temperature may be provided by variations in the pressure within the jacketed space, but I have found that a temperature suitable for efficient operation of the apparatus is $-40°$ F. or thereabout.

A condition of cold having thus been established at a uniform temperature throughout the apparatus, the gas to be treated (say natural gas) is introduced through tube 17 into chamber A where, coming in contact with the cold surfaces, a condensate, say the octane fraction, will be separated out, the residual gas with the remaining uncondensed vapors will then pass through tube 20 to chamber B where another condensate, say the heptane fraction, will be separated out. Thus the gas and vapors will pass successively from chamber to chamber, and in each a different condensate will be separated out, the hexane fraction in C, the pentane fraction in D, the butane fraction in E and the propane fraction in F. the final residuum of gas containing mostly methane, escaping at 21.

I have said that a uniform temperature of refrigerant is present throughout the apparatus, but the effect of the temperature thus produced has a varying effect in the successive condensation chambers for the reason that the gas, as it passes from one to another in the series becomes colder and colder and hence the various condensing points of the several fractions are thus reached in the compartments designed to receive them. The temperature of the gas in the final chamber F is substantially the same as that of the refrigerant. In other words, the gas is relatively warm as it enters the apparatus at 17 and becomes colder and colder as it passes from compartment to compartment.

As the various fractions condense in chambers A, B, C, etc. they will collect and rise therein in liquid form thus causing the gas issuing through the orifices or perforations 20 to bubble upward through the liquid.

Obviously, after an extended period the condensates will rise into the body compartments where they may be drawn off through the pipes 23 at suitable intervals, for example, octane at $a$, heptane at $b$. hexane at $c$, etc., etc.

As hereinbefore mentioned, my apparatus may be used for the treatment of various vapor-bearing gases, and the description of its operation in connection with natural gas and its fractions must be taken as illustrative only.

My appartus is designed to function at various temperatures and pressures. If the gas enters under a high pressure, it is only necessary to lower the refrigerant temperature to accommodate the increased gas volume. The higher the pressure on the gas the greater the yield of the apparatus.

The pressure within the machine may be regulated to a certain extent by the valve 22.

It will thus be seen that I provide a very simple and efficient apparatus which is quite flexible in its operation and may be run continuously so long as refrigerant and gas are supplied at required temperatures and pressures, and the various condensates are drawn off at appropriate intervals.

Various changes in the construction, arrangement, and assembly of parts are considered to be within the spirit of the invention and the scope of the claims.

I claim:

1. Apparatus for separating vapors from their carrier-gases by condensation, including a hollow body, means forming a series of condenser chambers communicating with said body but separated from each other, jackets surrounding said chambers and by means of which a rerigerating medium may be maintained in contact with said chambers, means for introducing gas into said apparatus wherein its carried vapors may be condensed, means for conducting the residual gas and vapors from each chamber to the chamber next adjacent to it in the series, and an outlet from said apparatus for the final residual gas.

2. Apparatus for separating vapors from their carrier-gases by condensation, including a tubular body provided with partitions dividing it into a plurality of separate compartments, tubes forming condenser chambers connected with the several compartments respectively in series, a jacket applied to and spaced from said tubes and body and adapted to receive a refrigerating medium, means for introducing the gas to be treated into one of said chambers wherein a portion of its vapor constituent is condensed, means for conducting the residual gas and vapors from the compartment communicating with said chamber to the next adjacent chamber in said series, similar means connecting each subsequent compartment with the next adjacent chamber throughout the series, and a discharge outlet for the residual gas from the last compartment in the series.

3. Apparatus for separating vapors from their carrier-gases by condensation, including a hollow body divided into a plurality of compartments, means providing a condenser chamber communicating with each of said compartments, a jacket surrounding said chambers and body and spaced therefrom to provide a receptacle for a refrigerating medium, a tube extending through said body for conducting refrigerating medium therethrough, and means for passing the gas to be treated through said apparatus from chamber to chamber, whereby its constituent vapors may be successively condensed.

4. Apparatus for separating vapors from their carrier-gases by condensation, including a hollow body provided with diaphragms forming a compartment, a tube connected therewith and forming a condenser chamber in communication with said compartment, a jacket applied to said body and chamber and spaced therefrom to provide a receptacle for a refrigerating medium, and means for circulating the gas to be treated through said compartment and chamber, whereby its constituent vapor may be condensed.

5. Apparatus for separting vapors from their carrier-gases by condensation, including a hollow body forming a compartment, a tube connected with said body and forming a condenser chamber in communication with said compartment, said body and chamber being jacketed for the reception of a refrigerating medium, means within said body for conducting a refrigerating medium therethrough, and means for circulating the gas to be treated through said compartment and chamber, whereby its constituent vapor may be condensed.

6. Apparatus for separating vapors from their carrier-gases by condensation, including a hollow body forming a compartment, means providing a condenser chamber communicating with said compartment, means for maintaining a refrigerating medium in contact with said body and chamber, and means for circulating the gas to be treated through said body and chamber including a tube extending into said chamber and provided with a foraminous gas outlet.

7. Apparatus for separating vapors from their carrier-gases by condensation, including a hollow body portion provided with heads and diaphragms dividing it into a plurality of separate compartments, means providing a condenser chamber communicating with each of said compartments, means including a spaced jacket for circulating a refrigerating medium in contact with said body and chambers, means for circulating a refrigerating medium through the interior of said body, means for introducing the gas to be treated into and permitting its escape from said apparatus including means for passing the gas through the plurality of compartments and chambers in succession whereby the constituent vapors may be successively condensed, and means for drawing off the condensate from each of said compartments separately.

8. Apparatus for separating vapors from their carrier-gases by condensation, including a horizontally arranged tubular body provided with heads and diaphragms dividing it longitudinally into a plurality of compartments, means defining a separate condenser chamber in communication with each of said compartments, means including a spaced jacket for circulating a refrigerating medium in contact with said body and the walls of said chambers, means for circulating the gas to be treated through said apparatus including tubes for conducting it from one chamber to the next adjacent chamber successively throughout the length of the apparatus, and means extending longitudinally of said body for conducting a refrigerating medium through the several compartments.

9. Apparatus for separating vapors from their carrier-gases by condensation, including a tubular body comprising a plurality of sections welded together, heads welded to the end section of the body, diaphragms welded in the ends of the intermediate sections whereby the body is divided longitudinally into a plurality of separate compartments, a tube welded into an opening formed in each body section and depending from said body, a head welded into the end of each tube, said tubes providing condenser chambers in communication with said compartments respectively, a jacket comprising a plurality of curved longitudinal plates welded end to end and spaced from said body and having its longitudinal edge welded to said body, end plates welded to the extremities of said longitudinal plates and to said body and spaced from the body, jackets enclosing said tubes and spaced therefrom and welded to said jacket surrounding said body at appropriate openings formed in said jacket, heads welded to the ends of said latter jackets, all of said jackets providing a space for the reception of a refrigerating medium, tubes welded to the heads of said body and extending through the body from end to end and in communication with the jacketed space for circulating the refrigerating medium through the interior of the body, and means including tubes welded to the body and to each other for circulating the gas to be treated through said apparatus.

10. Apparatus for separating vapors by condensation, including a series of condenser chambers, means for maintaining a substantially uniform condition of frigidity in all of said chambers, and means for conducting a stream of vapors through said chambers in succession including a vapor inlet extending into each chamber and terminating in proximity to the bottom thereof, and a vapor outlet from each chamber, the vapor outlet of each chamber being in communication with the vapor inlet of the chamber next succeeding it in series, whereby the constituent vapors of the stream of vapors may be successively condensed.

11. Apparatus for separating vapors by condensation, including a hollow body, means forming a series of condenser chambers communicating with said body but separated from each other, means for maintaining a substantially uniform condition of frigidity in all of said chambers, means for introducing a stream of vapors into said apparatus wherein said vapors may be condensed, means for conducting the uncondensed vapors from each chamber to the next adjacent to it in the series, and an outlet from said apparatus for any uncondensed vapors.

12. Apparatus for separating vapors by condensation, including a hollow body, means forming a series of condenser chambers communicating with said body, but separated from each other, means for maintaining a refrigerating medium in contact with said chambers, means for introducing a vapor stream into said apparatus and successively through the series of chambers wherein the constituent vapors may be successively condensed, and an outlet from said apparatus for any uncondensed vapors.

In testimony whereof I affix my signature.

JOHN C. SWAN.